United States Patent [19]

Cashdollar et al.

[11] 4,142,417

[45] Mar. 6, 1979

[54] MULTICHANNEL INFRARED PYROMETER

[75] Inventors: Kenneth L. Cashdollar, Bethel Park; Martin Hertzberg; Charles D. Litton, both of Pittsburgh, all of Pa.

[73] Assignee: The United States of America as represented by the Secretary of the Interior, Washington, D.C.

[21] Appl. No.: 901,041

[22] Filed: Apr. 28, 1978

[51] Int. Cl.$^2$ ............................................. G01J 5/10
[52] U.S. Cl. ............................. 73/355 R; 73/355 EM; 356/45
[58] Field of Search .................... 73/355 R, 355 EM; 356/43, 45

[56] References Cited

U.S. PATENT DOCUMENTS

| | | | |
|---|---|---|---|
| 3,475,961 | 11/1969 | Mossey | 73/355 R |
| 3,501,237 | 3/1970 | Lide | 73/355 R |
| 3,632,212 | 1/1972 | Bernal | 73/355 R |
| 3,972,615 | 8/1976 | Hill | 356/45 |
| 3,992,943 | 11/1976 | Schiefer | 73/355 R |
| 4,081,215 | 3/1978 | Penney | 73/355 |

Primary Examiner—S. Clement Swisher
Attorney, Agent, or Firm—Thomas Zack; Donald A. Gardiner

[57] ABSTRACT

An infrared radiation measuring pyrometer whose output is used to calculate both particle and gas temperatures from an explosion or fire. Preferably four infrared wavelength measurements are made to compute the particle temperature and two infrared wavelength measurements to compute the gas temperature. Especially constructed to operate in an explosion environment, the invention allows the simultaneous and continuous measurements for both particle and gas temperatures. Planck's Law is used to relate the radiation emitted from the particles and/or gas to the wavelengths observed, the emissivity of the object at that wavelength, and the temperature of the particles and/or gas. For each specific wavelength detected at the pyrometer there is an output voltage which can be related to the flame radiation. The actual temperatures for the particles and/or gas are determined by plotting the relative radiation-sensitivity factor times measured voltage at a specific wavelength - versus wavelength and then comparing these plots with Planck black body radiation curves or by using a computer or calculator program.

6 Claims, 6 Drawing Figures

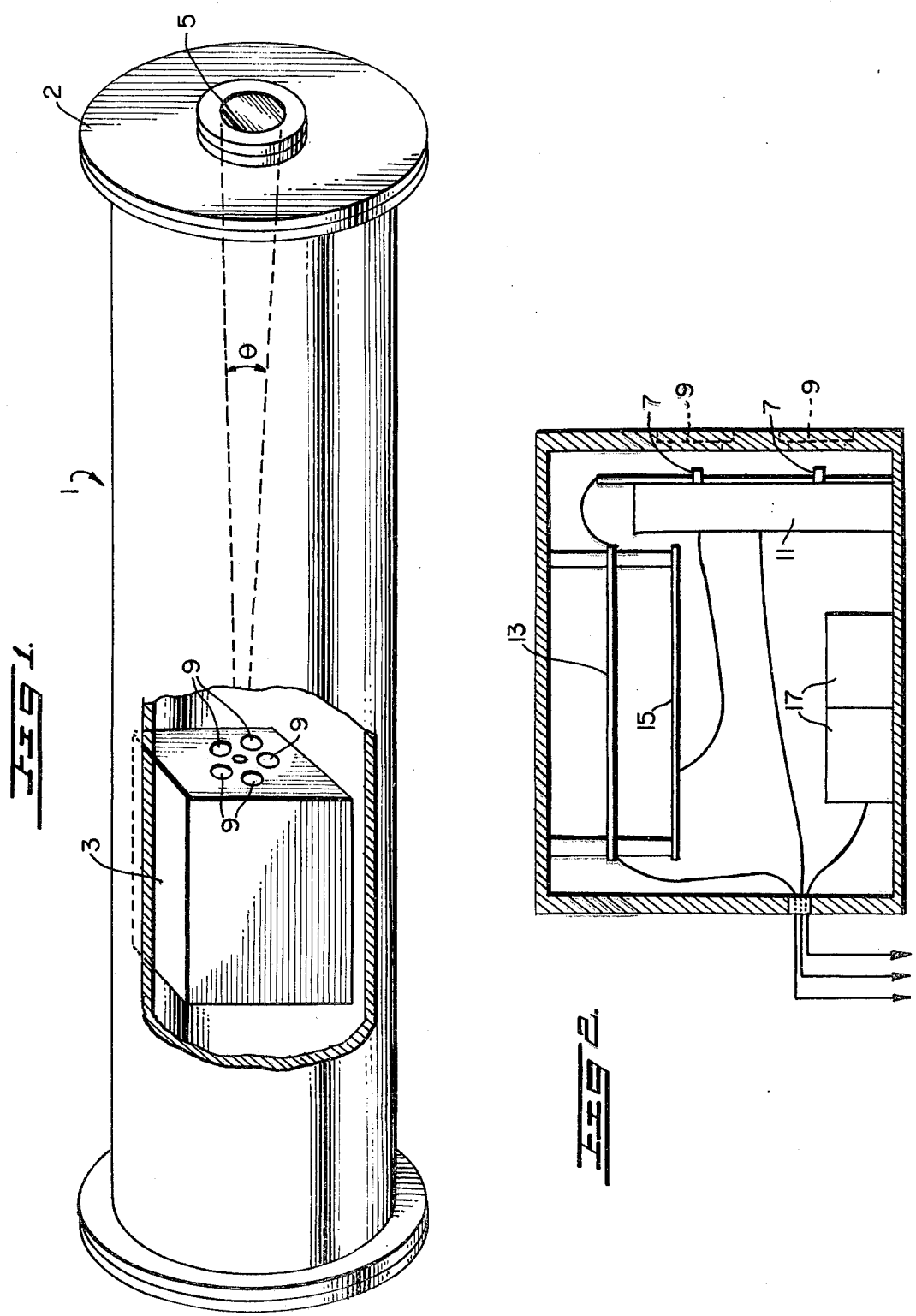

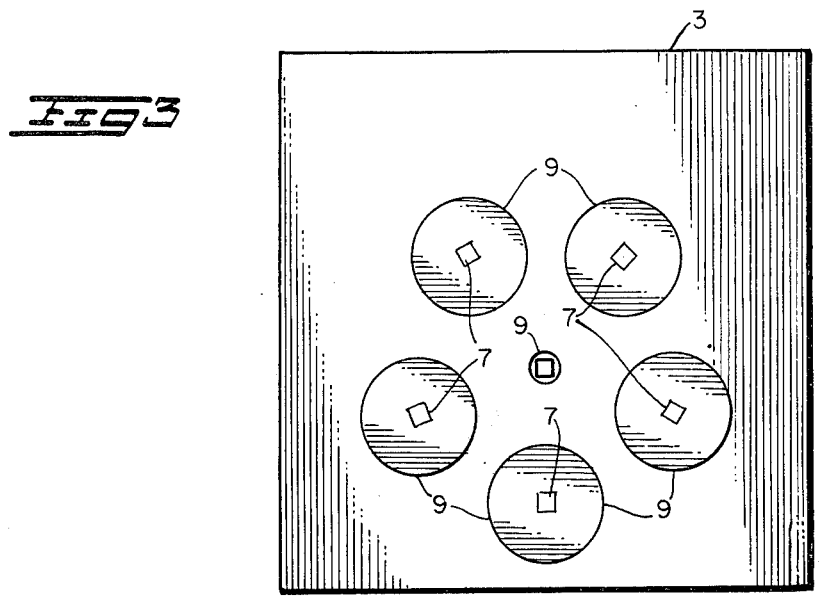
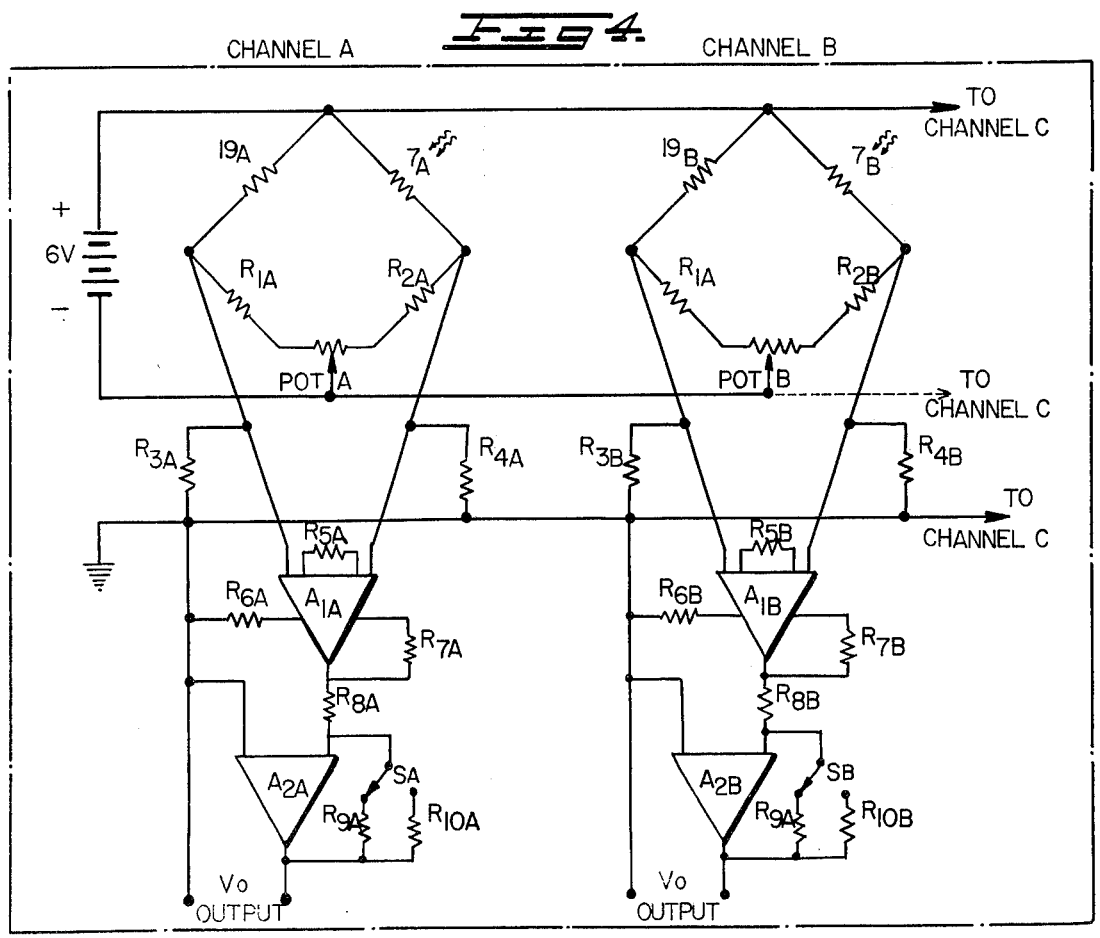

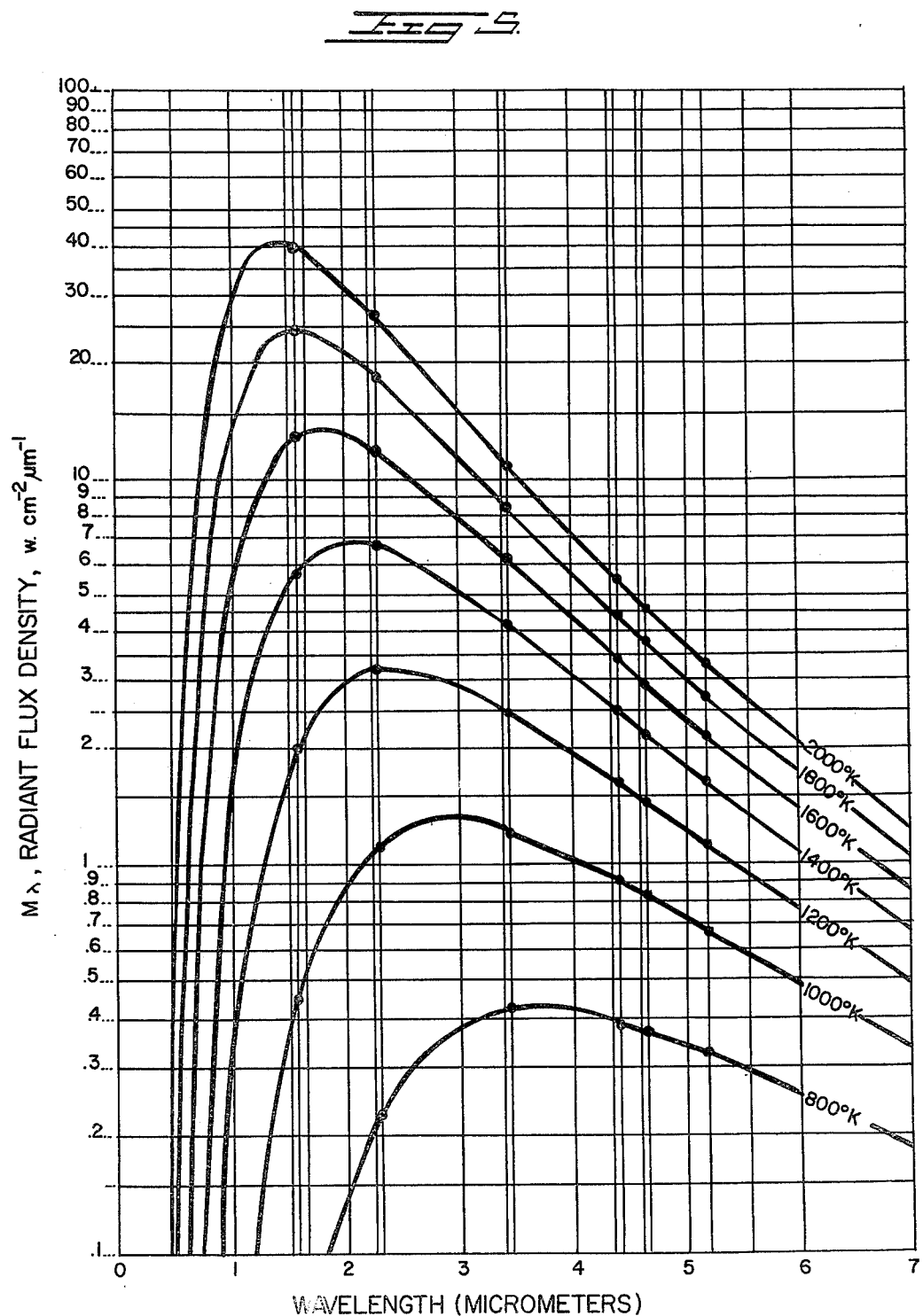

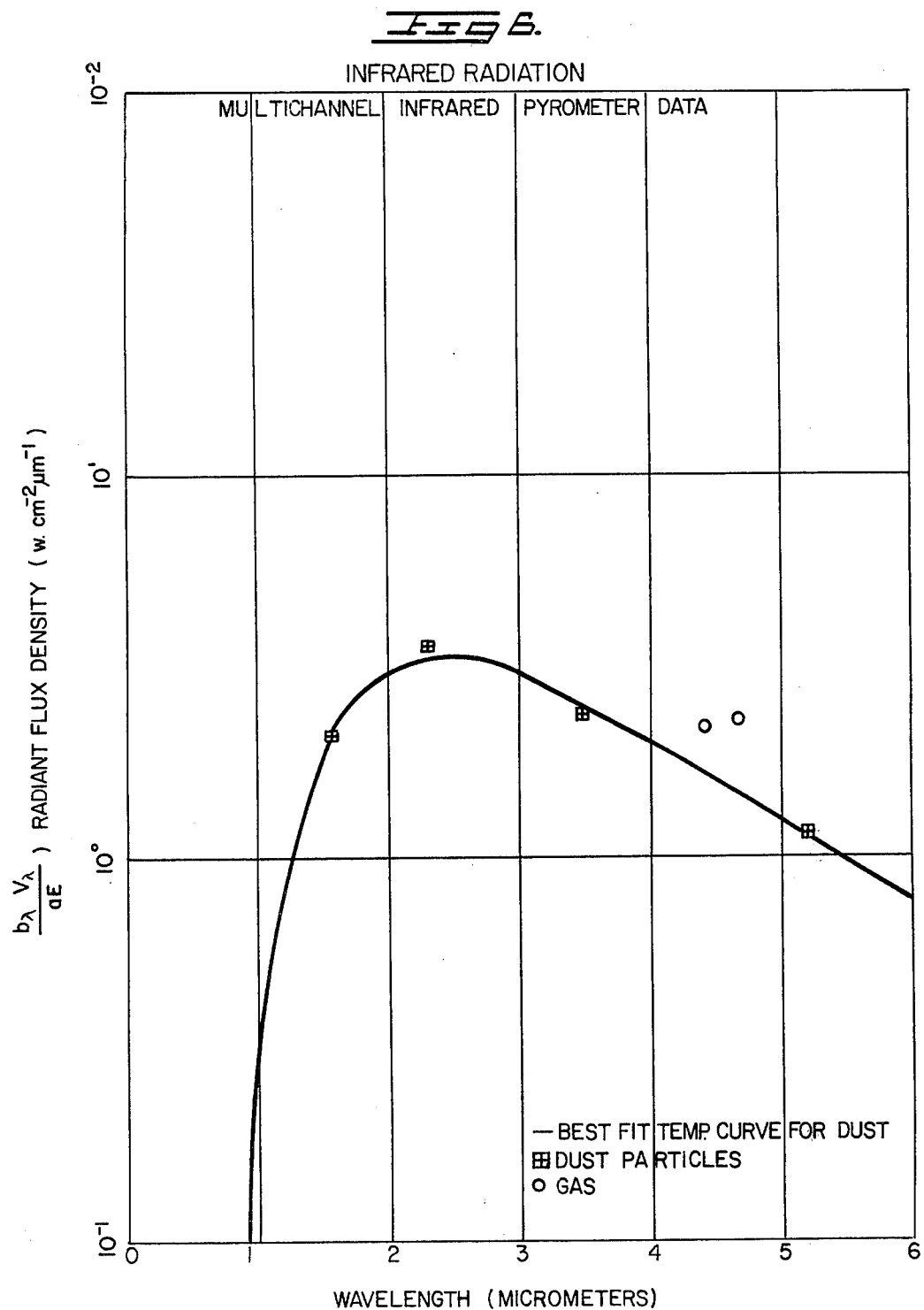

MULTICHANNEL INFRARED PYROMETER

BACKGROUND OF THE INVENTION

1. Field of the Invention

Our invention is a infrared radiation pyrometer.

2. Description of the Prior Art

Using single-wavelength or two-wavelengths infrared pyrometers is well known. In addition there are also infrared pyrometers which measure the entire infrared spectrum. As pointed out below, each of these instruments or systems has certain undesirable characteristics. None can simultaneously allow the measurement of both particle and gas temperatures within the short response time essential to observe explosions.

The single-wavelength infrared pyrometer has two distinct disadvantages. First the emissivity (ratio of the energy emitted by a surface to the energy emitted by an equal area of blackbody surface at the same temperature) of the hot object must be known. Also this same object must fill the entire field of view and have no intervening cloud of unburned particles between the hot flame and the pyrometer.

With the two-wavelength infrared pyrometers only particle temperatures are measured and not gas temperatures because they observe particle continuum radiation and not gas band radiation. Further these pyrometers do not supply enough results to compute the accuracy of the fit of the particle radiation to a Planck radiation curve since the standard deviation of the fit of the experimental points to the Plank curve can only be calculated if there are three or more wavelengths. Recently issued patents disclose two-wavelength pyrometers include, for example, the U.S. Pat. Nos. 3,501,237 (Lide) and 3,992,943 (Schiefer et al).

The infrared type of pyrometer which can measure the entire infrared spectrum may supply sufficient data to calculate both particle and gas temperatures. However, the delicate alignment of the optical components may not survive the shock of an explosion as the scanning spectrometers contain delicately aligned, moving parts which may be difficult to protect against the shock of an explosion. An additional disadvantage of this instrument is that it generates such a large amount of data for one scan that a large computer is necessary for the analysis of the data. In contrast our six-channel pyrometer with its faster response time than the scanning spectrometer allows the six data points we obtain with our invention to be converted to dust and gas temperatures by using a small, portable, programmable calculator.

In essence the difference between our invention and the known prior art resides in its construction to withstand the high pressure of an explosion and its ability to simultaneously record data used to calculate both particle and gas temperatures in the short response time necessary.

SUMMARY OF THE INVENTION

This infrared pyrometer includes an outer generally closed hollow housing with a window in which is mounted a second housing having a detector/amplifier assembly. The detector/amplifier assembly has at least four spaced detectors — each of which forms part of a separate bridge circuit — located behind individual wavelength discrimination filters, and an amplifier circuit. Radiation entering the pyrometer is first received at the window, then the lens, then the filters, then the detectors. The bridge circuit has a darkened detector to provide temperature compensation and the signal outputted by the amplifer circuit is linearly proportional to the magnitude of radiation incident on the radiation activated detectors. At least three provide measurements for the particle temperature calculation and at least one for the gas temperature calculation.

The primary object of this invention is an improved temperature measurement system for particles and gas.

BRIEF DESCRIPTION OF THE DRAWINGS

FIG. 1 depicts the outer housing of the preferred embodiment with part of its side cut away to show the internally mounted detector/amplifier assembly.

FIG. 2 illustrates a longitudinal cross-sectioned view of the detector/amplifier assembly.

FIG. 3 is a front view of the FIG. 2 detector assembly.

FIG. 4 is a circuit diagram for two of the six channels of the pyrometer.

FIG. 5 shows a graphical representation of Planck black body radiation curves for various temperatures. The vertical bands show the wavelengths and bandwidth curves for the six channels.

FIG. 6 graphically illustrates experimental results obtained from a mine explosion compared to the best fit Planck curve for the dust particle temperature.

Planck's law relates the radiation emitted from an ideal blackbody to the wavelength observed, and the temperature of the object. The theoretical equation describing this radiation may be expressed as follows: For blackbodies $$M_\lambda = \frac{2\pi h c^2}{\lambda^5} \left[ e^{\frac{hc}{\lambda kT}} - 1 \right]^{-1} \tag{1}$$

For non-blackbodies $$H_\lambda = \epsilon M_\lambda$$

where $M_\lambda$ and $H_\lambda$ are the radiation emitted in energy per unit area per unit time per unit wavelength interval; $\epsilon$ is the dimensionless emissivity; h is Planck's constant (6.626 − $10^{-27}$ erg·sec.); $\lambda$ is the wavelength of light observed in cm.; c is the speed of light (2.9979 × $10^{10}$ cm/sec.); and k is Boltzmann's constant (1.381 × $10^{-16}$ erg/° K.; e is the base of the natural logarithms (2.71828), and T is the temperature in degrees Kelvin (° K.).

A good explanation of these equations (1) may be found in the works of Charles S. Williams and Orville A. Becklund, Optics: A Short Course for Engineers and Scientists, Wiley - Interscience, 1972, p. 49. and also the work of Leo Levi, Applied Optics, John Wiley, 1968, pp. 171-175.

As will be described in more detail hereafter, the purpose of our invention is to measure the continuous radition of hot particles in a flame or explosion at least three but preferably four infrared wavelengths, i.e., 1.57, 2.30, 3.46, and 5.19 micrometers ($\mu$m). These specific wavelengths were chosen to avoid the discrete emission bands of gases in the flame. As is well known, an individual solid particle emits continuum radiation with an emissivity less than one. However, the emitted and scattered radiation integrated over an optically thick cloud of hot particles has an emissivity of one. In contrast, gases emit radiation at discrete bands of wavelengths corresponding to the quantized energies of the vibrational and rotational states of the molecule. For example, the gases in hydrocarbon flames which have strong emission bands in the region of the interest are water vapor and carbon dioxide at about 2.7 μm and carbon dioxide at about 4.4 μm.

In addition to measuring radiation from hot particles, like airborne coal dust, the pyrometer also simultaneously measures radiation from an emission band of gas. The particular gas selected to be measured in the preferred embodiment was carbon dioxide at a wavelength of 4.40 and 4.67 micrometers. To measure the radiation from the particles and gas, the radiation must be related to an outputted electrical characteristic from the pyrometer. In our preferred embodiment the measured output is a voltage level from the pyrometer which is related to the radiation by the relationship:

$$H_\lambda = \frac{b_\lambda V_\lambda}{a} \text{ or } M_\lambda = \frac{b_\lambda V_\lambda}{a\epsilon} \quad (2)$$

where $H_\lambda$ is the radiation at each specific wavelength, a is a constant scale factor independent of the wavelength, $b_\lambda$ is a sensitivity factor for each channel (or wavelength), and $V_{80}$ is the measured output voltage for each wavelength. The sensitivity factor $b_\lambda$ for each channel or wavelength must be determined by observations of an object of known spectral radiance such as a blackbody cavity which obeys Planck's Law. Substituting equation (1) into equation (2) we obtain:

$$b_\lambda V_\lambda = \frac{2a\epsilon\pi hc^2}{\lambda^5} \left[ e^{\frac{hc}{\lambda KT}} - 1 \right]^{-1} \quad (3)$$

Equation (3) is used to calculate the temperature. $V_\lambda$ is the measured quantity, $a\epsilon$ and T are the only unknowns since $b_\lambda$ can be determined by calibration with a blackbody cavity. a is a function of the fraction of the field of view filled by the flame, and the amount of radiation lost by cold dust coating on the window. Equation (2) states that the detector is linear and was empirically derived.

To arrive at the desired temperature measurement, it is convenient to restrict measurements to dust cloud flames which are optically thick (emissivity close to unity) for all six wavelengths. This eliminates the necessity of estimating (by theoretical calculation) the emissivity as a function of wavelenth which must be done for optically thin clouds. It is not necessary for the flame to fill the entire field of view of each detector because only the relative radiation at each wavelength — with one wavelength being detected by each channel or detector — is needed to compute the temperature. A coating of dust on the entrance window of the pyrometer does not affect the temperature calculated because the radiation attenuation has been experimentally determined to be independent of the wavelength for this spectral region. To determine the dust particle temperature, the measured relative radiation $b_\lambda V_\lambda$ of the four channels (set at the respective wavelengths of 1.57, 2.30, 3.46, and 5.19 micrometers) is plotted versus the wavelength and compared with the Planck blackbody radiation curves such as those of FIG. 5. The particle temperature and scale factor are determined by translating along the radiance axis until the best fit is obtained between the four measured points ($b_\lambda V_\lambda$) and one of the Planck curves. A more accurate particle temperature and scale factor can be computed by using a portable, programmable calculator for a nonlinear least squares fit of the four data points to the best Planck black body temperature curve. A larger, computer program has been developed to calculate the particle temperature and scale factor in a similar manner and also to calculate the standard deviation of the particle temperature and to plot the results as shown in FIG. 6.

For the gas temperature calculations, the scale factor $a\epsilon$ is usually assumed to be the same for both the dust and the gas. The value a is the same for both because the various detectors have essentially the same field of view. The emissivity $\epsilon$ is close to unity for both the dust and the gas for optically thick clouds (ones through which the transmission is close to zero at the wavelengths in question). However, for optically thin clouds, a theoretical calculation of the emissivity at the gas wavelengths and the dust wavelengths is necessary before the temperatures can be calculated. Once the scale factor a and the emissivity $\epsilon$ are known — either by using the value $a\epsilon$ calculated from the aforementioned dust particle temperature/scale factor calculations or from a theoretical calculation — the gas temperatures at 4.40 and 4.67μm can be calculated using the measured, relative radiation $b_\lambda V_\lambda$ at the two wavelengths and equation (3).

If the flame radiation relative voltage $b_\lambda V_\lambda$ as a function of wavelenth $\lambda$ is measured continuously as a function of time, the particle temperature and gas temperature can be calculated and plotted as a function of time by using a second computer program that we developed.

Some of the apparatus used to implement the just described procedure can be found in FIGS. 1-4. The hollow cylindrical steel housing 1 of FIG. 1 encloses the detector/amplifier housing 3 shown in this partially cutaway side view. The cylindrical housing of FIG. 1 is made from 0.65 cm thick steel and is strong enough to withstand explosions and protect the detector/amplifier box within. End flanges 2 with O-ring seals are bolted to both ends of the cylindrical housing. O-ring seals are also used at the window and lens to prevent dust from entering the housing. The front sapphire window 5 is for explosion protection. All internal components are rigidly mounted to prevent movement during the explosion. Aligned with the window are the six detectors 7 each of which is considered a different channel (A to F) responsive to a different infrared wavelength from the radiation. Optical interference filters located immediate in front of each detector dictate the responsive wavelengths. The solid angle $\theta$ from the center of the detectors to the circular edge of the window allows about a 18 square degrees (or 0.0055 steradians) field of view for each detector. The purpose of the lens is to focus incoming infrared radiation received at the window so that it is received by the detectors which are generally aligned in a common vertical plane. In one working embodiment the sapphire window was 7.6 cm diameter by 0.3 cm thick and the arsenic trisulfide lens was 7.6 cm diameter by 76.2 cm focal length.

As best depicted in FIGS. 2 and 3 the detector amplifier assembly is made up of the six detectors 7, the six filters 9, the aluminium heat sink 11, the bridge circuit board 13, the amplifiers circuit board 15, a gain switch, the battery power source 17; and six dark detectors 19. The six detectors with their associated six individual infrared interference filters are arranged so that radiation entering window-lens 5 is incident thereon. The six detectors and their associated filters and electronic circuitry provide the final output voltage signal $V_o$ which is linearly proportional to the radiation incident on the detector 7. By varying the resistance values for the FIG. 4 resistors and selecting amplifiers with the desired gains, the FIG. 4 circuits can be used for all six channels operating at their respective different wavelengths (1.57, 2.30, 3.46, 5.19 - particles - and 4.40 and 4.67 -gas- micrometers).

FIG. 4 illustrated two of the six channels (A to F inclusive) used for the detectors. The two channels shown have been designated channels A and B and the channel bridge circuits are powered by the common six volt battery. Power (±15 volts) for the amplifiers comes from an external power supply. Both channels are identical and employ the same number of detectors (7 and 19) resistors ($R_1$ to $R_{10}$), amplifiers ($A_1$ and $A_2$), gain switches ($S_A$ or $S_B$), etc. The subscripts A and B have been used to designate components associated with the specific channels A and B, respectively. Thus, always darkened detectors $19_A$ and $19_B$, which form part of the bridge circuit for their particular channels, would both perform the same function which is to provide temperature compensation for the respective second bridge circuit detectors, $7_A$ and $7_B$ which actually view the infrared radiation. This compensation is necessary due to the characteristic of lead selenide of changing its electrical resistance with ambient temperatures in addition to its change of resistance with incident infrared radiation.

The aluminum heat sink 11 keeps the six detectors ($7_A$ to $7_F$) and the six dark detectors ($19_A$ to $19_F$) of the bridge channel circuits all at the same temperature.

The potentiometer ($POT_A$ or $POT_B$) can be used to balance their bridge after small drifts occur caused by changes in ambient temperatures. These drifts are caused by imperfect temperature compensation by the dark detectors 19. As infrared radiation strikes the optically sensitive detectors ($7_A$ or $7_B$), after being filtered, the resistance of the detector decreases and unbalances the bridge. The signal from the bridge is then amplified by instrumentation amplifier $A_{1A}$ (or $A_{1B}$) and then by operational amplifier $A_{2A}$ (or $A_{2B}$). The output signal from these two amplifiers for each channel are fed through a connector on the detector/amplifier housing to an external recording device (not shown). This recording device may be a strip chart recorder or it may consist of a magnetic disc which receives the voltage output after it has been processed through an analog to digital converter. Digital information on the magnetic disc can then be sent to a computer programmed to perform the temperature calculations based on equation (3).

In one working embodiment of our invention, the outer steel housing 1 was 27 centimeter (cm) diameter by 108 cm long cylinder; the housing 3 was an aluminum box measuring 14 cm by 14 cm by 18 cm; the angle $\theta$ was 18 square degrees common field; and the five outer detectors 7 were arranged in 5 cm circle around their center detector.

Planck blackbody radiation curves for various temperatures (degrees Kelvin) are illustrated in FIG. 5. Superimposed on them are the six detected infrared pyrometer wavelengths and their respective bandwidths. FIGS. 5 and 6 are graphical representations of the radiant flux density versus the wavelength. The essential difference between these two figures is that FIG. 5 represents the theoretical Planck blackbody radiation curves for various temperatures whereas FIG. 6 represents the best fit Planck blackbody curve based on actual empirical results from a mine coal dust explosion. In FIG. 5 the wavelength in microns is plotted against the radiant flux density ($M_\lambda$) by inserting various values of temperatures (T) in the idealized Planck's law equation (1). The dark vertical narrow bands indicate the narrow bandwidth at which the six detectors of the pyrometer observe. The intersection of a vertical band with a given temperature Planck curve shows the expected radiation reaching a detector at that wavelength from an object of the given temperature. A cloud of hot dust particles emits radiation over the entire continuum shown by a Planck curve. The measured radiation $b_\lambda V_\lambda$ observed by the pyrometer at the four particle wavelengths (1.57, 2.30, and 3.46, and 5.19$\mu$m) is used to determine the shape of the observed continuum and hence its temperature. Carbon dioxide gas emits radiation over a fairly narrow band observed by the two detectors at 4.40 and 4.67$\mu$m.

Actual measured mine coal dust and gas temperatures from an explosion using our invention are shown in FIG. 6. These are represented by the six data points four of which are associated with the radiation from the particles and two of which are from the gas as illustrated in the key. The curve is the best fit Planck curve derived from a computer analysis using a nonlinear least squares fit of the four particle data points to equation (3) With the detectors set to respond to the six wavelengths of 1.57, 2.30, 3.46, 5.19, 4.40, and 4.67 microns the following, respective, values for $b_\lambda V_\lambda$ were measured: 5.597 V, 9.612 V, 6.401 V, 3.130 V, 5.960 V, and 6.150 V. Using this data we were able to conclude that the average dust particle temperature was 1215° K. with a standard deviation of 16° K. and a scale factor, $a\epsilon$, of 2.677. The gas (carbon dioxide) was calculated to be 1404° K. with a standard deviation of 70° K.

Preferably, as indicated heretofore, there should be four detectors set at four different distinct wavelengths to measure the particle temperature and two detectors set at two different distinct wavelengths to measure the temprature of the gas under observation. However, to accomplish the desired stated objectives there must be at least three detectors to allow for the determination of the particle temperature and an estimate of its accuracy using equation (3). And one detector to allow for the gas temperature determination also by equation (3).

Our invention is the only known instrument which accurately allows the simultaneous measurements of both the average particle temperature and that of gas in an explosion. This information is very useful in understanding the physics and chemistry of explosions. Examples of applications where this knowledge would be used would be the development of new explosion inhibitors and the temperatures at which they decompose; and the development of coal fired burners by measuring the accuracy of the internal temperatures. In fact, in any environment where knowledge of the temperatures of the particles and gases are useful, one may find application of this invention.

Other variations from the preferred embodiment disclosed are possible. None should be used to vary the scope and extent of our invention which is to be measured only by claim which follow.

We claim:

1. An infrared pyrometer for simultaneously obtaining measurements to determine both particle and gas temperatures comprising in combination:
   an outer generally closed hollow housing having a window facing in the measuring direction;
   a second inner housing located within said outer housing and having an infrared detector/amplifier assembly therein;
   and said detector/amplifier assembly comprising at least four separate infrared detectors each having its own filter and being responsive to a discrete infrared wavelength that is different for each detector, at least three of said detectors being used to obtain readings for determining particle temperatures, said assembly also having amplifier circuit means including said detector for electronically indicating the receipt of the radiaition at the discrete infrared wavelength at each detector to output a signal which is linearly proportional to the magnitude of the input radiation.

2. The pyrometer of claim 1 where said means for electronically indicating the receipt of the discrete wavelength is a bridge circuit with one segment of said bridge having said detector and another segment having a temperature compensating resistance.

3. The pyrometer of claim 2 wherein both bridge detector and temperature compensating resistance are made of lead selenide, said compensating resistor being a darkened infrared detector.

4. The pyrometer of claim 2 also including in said bridge circuit a variable resistor to allow balancing of the bridge circuit caused by changes in ambient temperatures.

5. The pyrometer of claim 2 including a common supply for the bridge circuits.

6. The pyrometer of claim 1 wherein the outer housing has a lens behind its window to focus incoming infrared radiation on said plurality of detectors

* * * * *